3,361,870
ELECTRIC POWER TRANSMISSION SYSTEM INCLUDING THREE PHASE CONDUCTORS EACH DISPOSED IN A SEPARATE RETURN CONDUCTOR
Daniel L. Whitehead, Franklin Township, Export, Pa., assignor to Westinghouse Electric Corporation, Pittsburgh, Pa., a corporation of Pennsylvania
Filed July 26, 1965, Ser. No. 474,757
9 Claims. (Cl. 174—99)

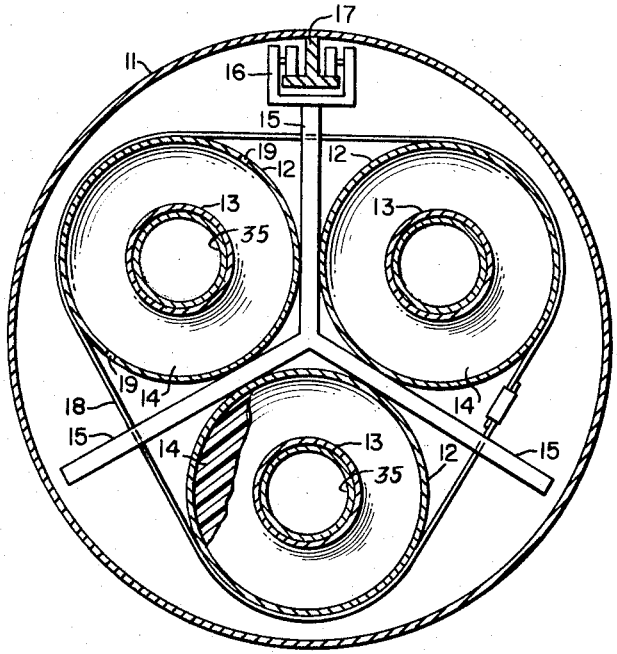
FIG. 1.
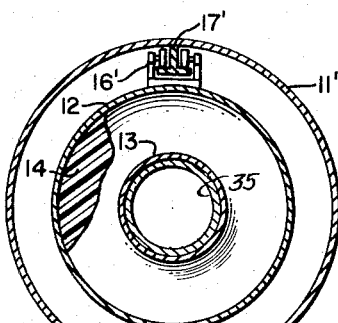
FIG. 2.
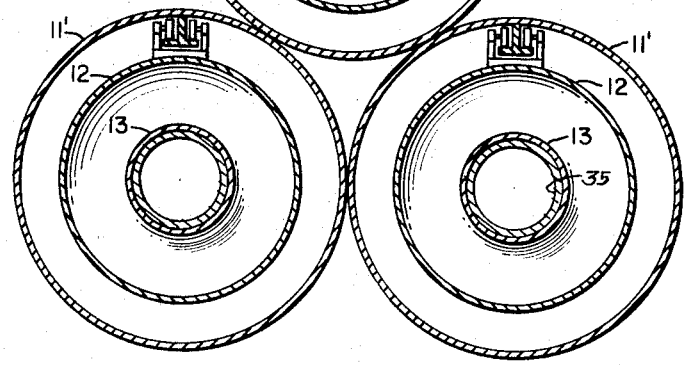
INVENTOR
Daniel L. Whitehead
BY
Clement L. McHale
ATTORNEY ތ
United States Patent Office 3,361,870
Patented Jan. 2, 1968

ABSTRACT OF THE DISCLOSURE

This invention relates, generally, to electric power transmission systems and, more particularly, to systems in which current conductors are enclosed in pipes containing an insulating medium under pressure. More specifically, each phase conductor of a three-phase power system is supported inside a hollow cylindrical return conductor by insulators spaced along the phase conductor. In one construction, the three return conductors are carried inside a single pressure pipe by frames carried by a trolley running on a rail mounted inside the pipe. In another construction, each return conductor is carried inside a separate pressure pipe by trolleys running on a rail mounted inside the associated pressure pipe.

---

One of the problems encountered in the system described in a copending application Ser. No. 474,799, filed July 26, 1965 by D. L. Whitehead and assigned to the Westinghouse Electric Corporation is the difficulty of assembling the conductors inside the enclosing pipes in the field, particularly when relatively long distances are involved. As described in the aforesaid application, each phase conductor of a three-phase system may be enclosed in a separate pipe capable of withstanding the pressure of the insulation medium, or all three conductors may be enclosed in one pressure pipe.

An object of this invention is to provide for installing prefabricated sections of conductor inside a cylindrical pipe line.

Another object of the invention is to provide for connecting two sections of the conductor together.

A further object of the invention is to provide a means for taking care of thermal expansion and contraction of the connected sections of conductor.

Still another object of the invention is to provide for pulling a string of connected conductor sections into or out of a pipe line.

A still further object of the invention is to reduce voltage gradients at the connection between conductor sections.

Other objects of the invention will be explained fully hereinafter or will be apparent to those skilled in the art.

In accordance with the invention, each phase or primary conductor of a three-phase system is supported inside a cylindrical return conductor by disc-shaped insulators spaced along the conductor. In one embodiment, the three return conductors are carried inside one pressure pipe by frames carried by trolleys running on a rail mounted inside the pipe. Each frame comprises three legs spaced 120° apart, one leg being attached to a trolley. In another embodiment, each return conductor is carried inside a separate pressure pipe by trolleys attached to the return conductor and running on a rail mounted inside the pipe. The sections of phase conductor are joined by finger type connectors and the sections of return conductor are joined by slip collars connected to the conductor by flexible connectors, thereby taking care of expansion and contraction of the conductors. Drag straps span each joint to permit a string of connected sections to be pulled into the pressure pipe.

For a better understanding of the nature and objects of the invention, reference may be had to the following detailed description, taken in conjunction with the accompanying drawings, in which:

FIGURE 1 is a view, partly in section and partly in elevation, of a three-phase electric power transmission system embodying features of the invention;

FIG. 2 is a view, similar to FIG. 1, of a different embodiment of the invention.

Figure 3:
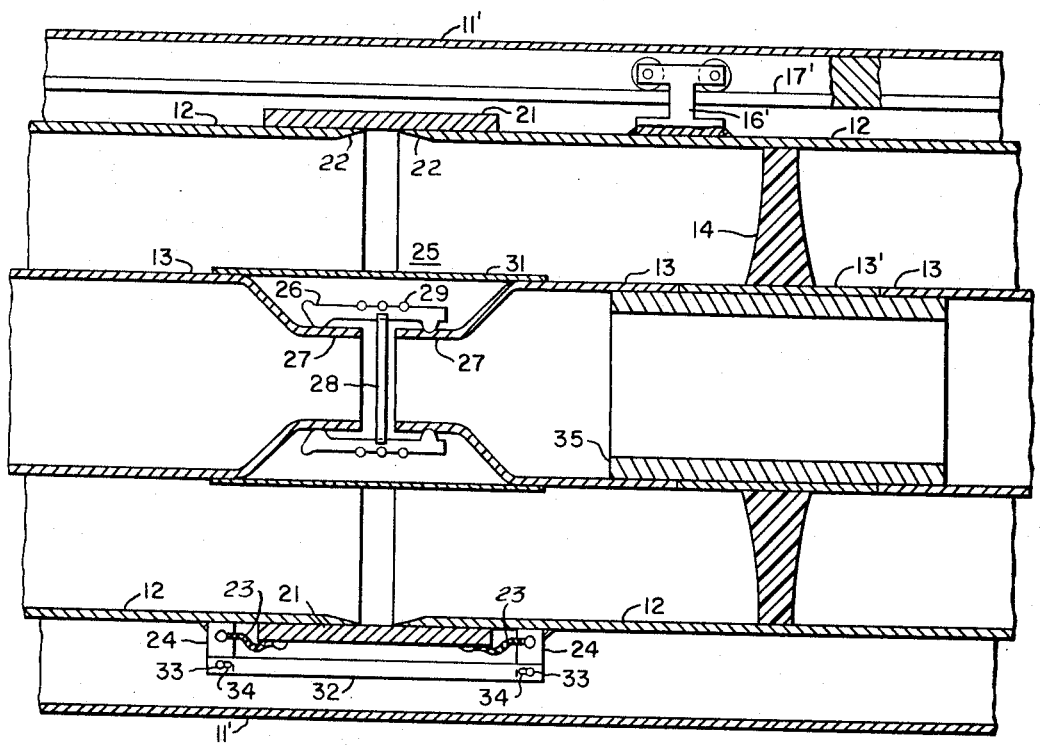
FIG. 3 is an enlarged view, partly in section and partly in elevation, of a joint between sections of the conductors of the system.

Referring to the drawings, and particularly to FIG. 1, the structure shown therein comprises a cylindrical pipe 11 which encloses three cylindrical return conductors 12 inside of each one of which is mounted a primary or phase conductor 13. Each phase conductor 13 is supported inside one of the return conductors 12 by generally disc-shaped insulators 14 which are spaced along the conductor. The return conductors 12 are carried in the pipe by a generally Y-shaped frame consisting of three legs 15 disposed 120° apart. One of the legs 15 is attached to a trolley 16 which runs on a rail 17 mounted inside the pipe 11. The frames 15 are spaced along the conductors at desired intervals. The return conductors 12 may be retained in position on the frame 15 by means of metal bands 18 which surround the conductors at desired intervals.

The pipe 11 is preferably composed of steel capable of containing an insulating fluid, preferably a relatively high dielectric gas, such as sulfur hexafluoride ($SF_6$), at a pressure above atmospheric pressure. The return conductors 12 are preferably composed of a relatively light conducting material, such as aluminum. The phase conductors 13 are preferably composed of a conducting material, such as copper. The insulators 14 are preferably composed of a snythetic resin, although porcelain or glass may be utilized if desired. As described in the aforesaid copending application, holes 19 are provided in the return conductors 12 in staggered relation to permit insulating gas to be distributed inside the return conductors 12, as well as inside the pressure pipe 11.

The rail 17 may be attached to the inner periphery of the pipe 11 by welding or other suitable means. The rail 17 extends along the full length of the pipe 11. Thus, prefabricated sections of the return conductors 12 and the phase conductors 13, which are joined in a manner described more fully hereinafter, may be rolled into the pipe 11. This method of final assembly allows the installation of the pressure pipe 11 by conventional means utilized in laying cross country gas lines. The conductor sections can be built under controlled factory conditions, and delivered to the site and simply rolled into place to form a continuous conductor.

In the embodiment of the invention shown in FIG. 2, each return conductor 12 and its associated phase conductor 13 are carried in a separate pressure pipe 11' by means of a trolley 16' which is attached directly to the return conductor and runs on a rail 17' attached to the pressure pipe 11'. The pipes are preferably arranged in a triangular configuration. The return conductors 12 provide paths for the zero-sequence current resulting from any unbalance of the phase currents, thereby reducing the heating losses which result from zero-sequence current flowing in the steel pressure pipes. As explained hereinbefore, the return conductors 12 may be made of a relatively light material since the gas pressure is normally equalized on the inside and outside of the return conductors in the manner hereinbefore described.

The conductor sections may be connected together in the manner shown in FIG. 3. Two sections of the return conductor 12 are joined by a slip collar 21 which surrounds the two ends of the return conductor sections. The inside edges of the conductor section are beveled as shown at 22 to reduce voltage gradients at that point to an acceptable value. The collar 21 is connected to each conductor section 12 by flexible connectors 23 which are attached to lugs 24 secured to the conductor sections 12. This permits the conductor sections to expand or contract and still maintain good electrical contact.

The primary or phase conductor sections 13 are joined by a connector 25 which may be of the type utilized on draw-out type circuit breakers in metal enclosed switchgear. The connector 25 comprises a plurality of contact fingers 26 which engage reduced diameter portions 27 of the two conductor sections 13. The fingers 26 are retained in spaced relation by a notched spacing ring 28 and are biased into contact with the conductor portions 27 by means of heavy garter springs 29 which surround the fingers 26. Thus, relative movement is permitted between the conductor sections 13 to take care of expansion and contraction. A corona shield 31 is provided around the connector 25.

In order to permit the connected section to be pulled into or out of the pressure pipe 11', a pull strap 32 is attached to the lugs 24 by bolts or rivets 33 which are disposed in elongated openings 34 in the strap 32. Thus, relative motion between the conductor sections 12 is permitted, but, the motion is limited by the strap 32 which spans the joint between the sections. Therefore, a string of connected conductor sections may be pulled into a pressure pipe in much the same manner as a string of cars is pulled into a railroad tunnel. The conductor sections 12 are carried in the pipe 11' by trolleys 16' which run on a rail 17' in the manner hereinbefore described.

As shown in FIG. 3, the insulator 14 may be bolted on a short section of conductor 13' which is then connected to two sections of conductor 13 by a heavy sleeve or plug 35 which may be pressed or welded inside the conductor section in the manner described in the aforesaid copending application. Thus, the insulator 14 is attached to the conductor 13' in a manner which prevents corona and the conductor 13' is attached to the conductor sections 13 in a manner which also prevents corona.

The length of individual sections can be varied to fit existing conditions. For long straight runs they can be quite long, the length being determined primarily by the maximum shipping length. For making bends they would be necessarily relatively short.

From the foregoing description, it is apparent that the invention provides for assembling the conductors of an enclosed transmission system in a relatively simple manner. The current conductors can be prefabricated and then rolled into place in a previously laid pipe to form a continuous conductor. Expansion of the conductors is taken care of in a simple manner.

Since numerous changes may be made in the above-described construction and different embodiments of the invention may be made without departing from the spirit and scope of the invention, it is intended that all subject matter contained in the foregoing description or shown in the accompanying drawings shall be considered as illustrative and not in a limiting sense.

I claim as my invention:

1. In a three phase transmission system, in combination, a hollow cylindrical pipe having a rail mounted inside of the pipe, three generally parallel phase conductors disposed inside the pipe, a cylindrical return conductor surrounding each phase conductor and disposed inside the pipe, insulators supporting the phase conductors inside the return conductors, and trolley means running on the rail and carrying the phase and return conductors in the pipe.

2. In a three phase transmission system, in combination, a hollow cylindrical pipe having a rail mounted inside of the pipe, three generally parallel phase conductors disposed inside the pipe, a cylindrical return conductor surrounding each phase conductor and disposed inside the pipe, insulators supporting the phase conductors inside the respective return conductors, a generally Y-shaped frame having three legs supporting the three return conductors, and a trolley attached to one leg of the frame, said trolley running on the rail and carrying the phase and return conductors in the pipe.

3. In a three phase transmission system, in combination, a hollow cylindrical pipe having a rail mounted inside the pipe, three generally parallel phase conductors disposed within the pipe, a cylindrical return conductor disposed within the pipe and surrounding each phase conductor, insulators supporting the phase conductors inside the return conductors, a generally Y-shaped frame having three legs spaced 120° apart supporting the three return conductors, a band extending transversely around all three return conductors to retain said return conductors on said frame, and a trolley attached to one of said legs, said trolley running on the rail and carrying the phase and return conductors in the pipe.

4. In a three phase transmission system, in combination, three hollow cylindrical pipes each having a rail mounted inside the pipe, three generally parallel phase conductors disposed within the respective pipes, a hollow cylindrical return conductor surrounding each phase conductor and disposed within the associated pipe, insulators supporting the phase conductors inside the return conductors, and a trolley attached to the outside of each return conductor, said trolley running on a rail in one of the pipes and carrying the return conductor and its associated phase conductor in the pipe.

5. In an electrical power transmission system, in combination, a cylindrical pipe, two sections of primary conductor disposed inside the pipe and having adjacent ends axially spaced from one another, a section of cylindrical return conductor disposed inside the pipe and surrounding each section of primary conductor, insulators supporting the primary conductor sections inside the return conductor section, means slidably engaging the adjacent ends of the sections of primary conductors for connecting corresponding sections of primary conductor together end to end in a manner to permit relative movement between connected sections of primary conductor in the pipe, and means spanning the joint between and attached to both of said return conductor sections for limiting said relative movement.

6. In an electrical power transmission system, in combination, a cylindrical pipe having only a single rail mounted inside the pipe, two sections of primary conductor disposed inside the pipe and having adjacent ends axially spaced from one another, a section of hollow cylindrical return conductor surrounding each section of primary conductor and disposed inside the pipe, insulators supporting the primary conductor sections inside the return conductor sections, means slidably engaging the adjacent ends of the primary conductors for connecting corresponding sections of primary conductor together end to end in a manner to permit relative movement between connected sections of primary conductor in the pipe, means spanning the joint between and attached to both of said return conductor sections for limiting said relative movement of said return conductor sections, and trolleys running on the rail and carrying the connected sections of the primary and return conductors in the pipe.

7. In an electrical power transmission system, in combination, a cylindrical pipe having a rail mounted inside the pipe, two sections of primary conductor disposed inside the pipe and having adjacent ends axially spaced from one another, a section of cylindrical return conductor surrounding each section of primary conductor and disposed inside the pipe, insulators supporting the primary conductor sections inside the return conductor sections, means slidably engaging the adjacent ends of the primary conductors for connecting corresponding sections of primary conductor together end to end in a manner to permit relative movement between connected sections of primary conductor in the pipe, a pull strap spanning the joint between return conductor sections and disposed inside the pipe, said pull strap being movably attached to both of the return conductor sections to permit them to be pulled into the pipe, and trolleys attached to the return conductor sections and running on the rail and carrying the connected sections of primary and return conductors in the pipe.

8. In an electrical power transmission system, in combination, a cylindrical pipe, two sections of primary conductor disposed inside the pipe and having adjacent ends axially spaced from one another, a section of cylindrical return conductor surrounding each section of primary conductor and disposed inside the pipe, insulators supporting the primary conductor sections inside the return conductor sections, a slip collar movably connecting the return conductor sections together, bridging contact fingers movably connecting the adjacent ends of the primary conductor sections together, a lug attached to each return conductor section adjacent the slip collar, flexible conductors connecting the lugs to the slip collar, and a pull strap movably disposed inside the pipe and attached to both of the lugs to permit the connected sections to be pulled into the pipe.

9. In an electrical power transmission system, in combination, a cylindrical pipe having a rail mounted inside the pipe, two sections of primary conductor disposed inside the pipe and having adjacent ends axially spaced from one another, a section of cylindrical return conductor surrounding each section of primary conductor and disposed inside the pipe, insulators supporting the primary conductor sections inside the return conductor sections, a slip collar movably connecting the return conductor sections together, bridging contact fingers movably connecting the adjacent ends of the primary conductor sections together, a lug attached to each return conductor section adjacent the slip collar, flexible conductors connecting the lugs on the respective return conductor sections to the slip collar, a pull strap movably disposed inside the pipe and attached to both of the lugs to permit the connected sections of return conductors to be pulled into the pipe, and trolleys running on the rail and carrying the connected sections of primary and return conductors in the pipe.

References Cited

UNITED STATES PATENTS

| | | | |
|---|---|---|---|
| 1,037,522 | 9/1912 | Von Pindtershofen | 174—27 |
| 1,906,209 | 4/1933 | Harding et al. | 248—55 |
| 2,191,071 | 2/1940 | Duttera | 174—28 |
| 2,229,006 | 1/1941 | Rudd. | |
| 2,306,527 | 12/1942 | Daniels | 174—27 X |
| 2,784,012 | 3/1957 | Killian et al. | |
| 2,969,438 | 1/1961 | Herrman et al. | 248—58 X |

LARAMIE E. ASKIN, *Primary Examiner.*